United States Patent
Coulter et al.

(10) Patent No.: US 8,643,872 B2
(45) Date of Patent: Feb. 4, 2014

(54) METHOD AND SYSTEM FOR GENERATING UNIQUE OBJECT IDENTIFIERS FOR DERIVED OBJECTS

(75) Inventors: Justin Coulter, Longmont, CO (US); Timothy Towns, Longmont, CO (US)

(73) Assignee: Infoprint Solutions Company LLC, Boulder, CO (US)

( * ) Notice: Subject to any disclaimer, the term of this patent is extended or adjusted under 35 U.S.C. 154(b) by 1138 days.

(21) Appl. No.: 12/262,977

(22) Filed: Oct. 31, 2008

(65) Prior Publication Data

US 2010/0110474 A1  May 6, 2010

(51) Int. Cl.
*G06F 3/12*       (2006.01)
*G06F 15/00*      (2006.01)
*G06K 1/00*       (2006.01)

(52) U.S. Cl.
USPC .......................................... 358/1.15; 358/1.9

(58) Field of Classification Search
None
See application file for complete search history.

(56) References Cited

U.S. PATENT DOCUMENTS

| | | | |
|---|---|---|---|
| 5,727,220 A | 3/1998 | Hohensee et al. | |
| 6,987,506 B1 | 1/2006 | Lapstun et al. | |
| 7,114,863 B2 | 10/2006 | Heiney et al. | |
| 7,370,090 B2 | 5/2008 | Nakaoka et al. | |
| 2002/0078019 A1 | 6/2002 | Lawton | |
| 2002/0161830 A1 | 10/2002 | Mukaiyama et al. | |
| 2004/0156075 A1 | 8/2004 | Hohensee et al. | |
| 2005/0094172 A1 | 5/2005 | Engelman et al. | |
| 2005/0094173 A1 | 5/2005 | Engelman et al. | |
| 2005/0248787 A1 | 11/2005 | Aschenbrenner et al. | |
| 2005/0275861 A1 | 12/2005 | Ferlitsch | |
| 2005/0278697 A1* | 12/2005 | Hodge | 717/115 |
| 2006/0050288 A1 | 3/2006 | Aschenbrenner et al. | |
| 2006/0168077 A1 | 7/2006 | Nemmaier et al. | |
| 2007/0027895 A1 | 2/2007 | Bridges et al. | |
| 2009/0168082 A1* | 7/2009 | Aschenbrenner et al. | 358/1.9 |
| 2009/0265720 A1* | 10/2009 | Nagampalli et al. | 719/321 |

OTHER PUBLICATIONS

"PCT Search Report & Written Opinion", PCT/US 09/62883, 1-11.
European Search Report, European Patent Application No. 09824202.7-1245/2344890 PCT/US2009/062883 Mailed Nov. 26, 2012, 7 pages.

* cited by examiner

*Primary Examiner* — Fan Zhang
(74) *Attorney, Agent, or Firm* — Blakely, Sokoloff, Taylor & Zafman LLP

(57) ABSTRACT

A print control unit coupled with a printer, the print control unit electronically connected to the host to provide one or more base resources to a unique Object Identifier (OID) generator, the one or more base resources including printing instructions. The unique OID generator generates a unique OID relating to a derived resource via a unique OID generation module. The unique OID includes the printing instructions of the one or more base resources. A resource generator internally generates the derived resource.

20 Claims, 6 Drawing Sheets

402

| OID Component | Value |
|---|---|
| OID Format | X'06' |
| OID Length | <Not Calculated Yet> |
| OID Seed | <Not Calculated Yet> |
| OID MD5 | <Not Calculated Yet> |
| OID Object Size | <Not Calculated Yet> |

404

| OID Component | Value |
|---|---|
| OID Format | X'06' |
| OID Length | <Not Calculated Yet> |
| OID Seed | X'2A8150812B01' |
| OID MD5 | <Not Calculated Yet> |
| OID Object Size | <Not Calculated Yet> |

406

| OID Component | Value |
|---|---|
| OID Format | X'06' |
| OID Length | <Not Calculated Yet> |
| OID Seed | X'2A8150812B01' |
| OID MD5 | X'81BF9FB1BAD2CFBEA6CFCB97F295D1A3AF9B12' |
| OID Object Size | <Not Calculated Yet> |

408

| OID Component | Value |
|---|---|
| OID Format | X'06' |
| OID Length | <Not Calculated Yet> |
| OID Seed | X'2A8150812B01' |
| OID MD5 | X'81BF9FB1BAD2CFBEA6CFCB97F295D1A3AF9B12' |
| OID Object Size | X'8193E05A' |

410

| OID Component | Value |
|---|---|
| OID Format | X'06' |
| OID Length | X'1D' |
| OID Seed | X'2A8150812B01' |
| OID MD5 | X'81BF9FB1BAD2CFBEA6CFCB97F295D1A3AF9B12' |
| OID Object Size | X'8193E05A' |

Final Encoded OID
061D2A8150812B018BF9FB1BAD2CFBEA6CFCB97F295D1A3AF9B128193E05A

FIG. 4

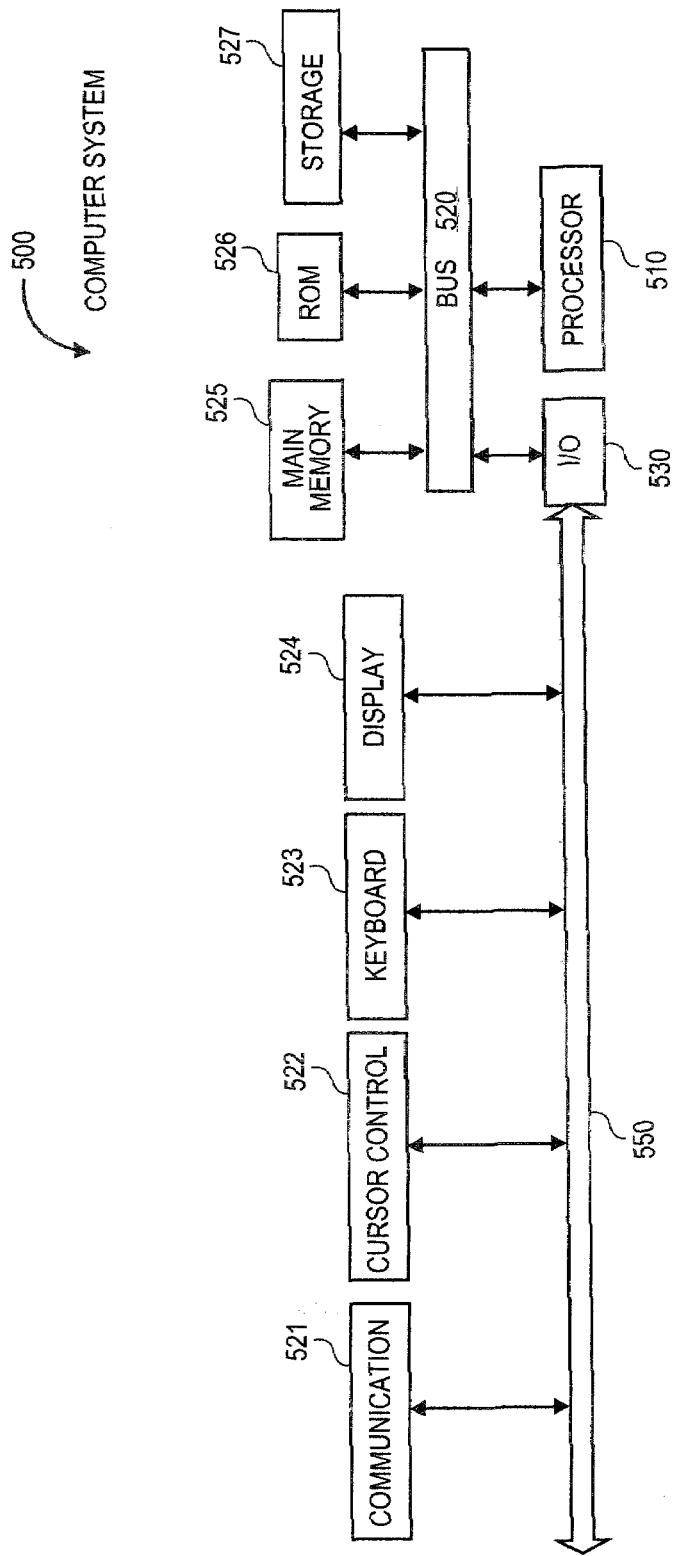

METHOD AND SYSTEM FOR GENERATING UNIQUE OBJECT IDENTIFIERS FOR DERIVED OBJECTS

FIELD

This invention relates generally to the field of printing systems. More particularly, the invention relates to generating unique Object identifiers for derived objects in a printing system.

BACKGROUND

In today's printing systems, typically, a printer control unit (PCU) deals with numerous resources to manage complex data and presentation objects. For example, there exists situations where the host software at the printer control unit utilizes a complex resource having multiple resource components, such as at least one base resource and at least one resource derived from the base resource, to perform the job of managing complex data and presentation objects prior to printing a document. For example, in the color-matching-resources area, two base resources (e.g., (1) color conversion instructions or profile from a camera, and (2) color conversion instruction or profile relating to a printer) are combined to provide a derived resource (e.g., color conversion) to output data via an output device, such as a printer.

However, often the host software fails to provide a derived resource (or provides only a partial derived resource) to the PCU, which forces the PCU to locate for the necessary derived resource by either repeatedly searching for an existing derived resource or repeatedly generating a derived resource. PCU is often unable to determine derived resource existence and thus is forced to repeatedly generate the derived resource, negatively impacting performance This conventional technique employing a non-complex model generating an Object Identifier (OID) using standard techniques having the OID components consists only of the derived resource information. Hence, at least one problem with this technique is the loss of base resource information from the derived resource OID. The non-preservation of the base resource and the loss of its relationship with the derived resource prevent any future derived resource discovery using host software-supplied base resource information.

Therefore, what is desired is generating and using unique OIDs for derived objects in a printing system.

SUMMARY

In one embodiment, a system having a unique Object Identifier generator residing at a print control unit of a printing system is disclosed. The print control unit coupled with a printer, the print control unit having host to provide one or more base resources to the unique OID generator, the one or more base resources including printing instructions. The unique OID generator generates a unique OID relating to a derived resource via a unique OID generation module. The unique OID includes the printing instructions of the one or more base resources. A resource generator internally generates the derived resource according to the related unique OID.

In another embodiment, a method is disclosed. The method includes providing one or more base resources to a unique Object Identifier generator, the one or more base resources including printing instructions, generating a unique OID relating to a derived resource via a unique OID generation module, wherein the unique OID includes the printing instructions of the one or more base resources, and internally generating the derived resource according to the related unique OID.

BRIEF DESCRIPTION OF THE DRAWINGS

A better understanding of the present invention can be obtained from the following detailed description in conjunction with the following drawings, in which:

FIG. 4 illustrates an embodiment of a transaction sequence for calculating various components of a unique OID; and FIG. 5 illustrates a computer system on which an embodiment of a unique Object Identifier generator may be implemented.

DETAILED DESCRIPTION

A printing system having a unique OID generator for generating unique OID for derived objects is described. In one embodiment, a unique OID is generated to enable a one-time generation of a derived resource and/or subsequent access of the generated derived resource rather than having to regenerate the derived resource each time a process is to be repeated. In the following description, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form to avoid obscuring the underlying principles of the present invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Figure 1A:
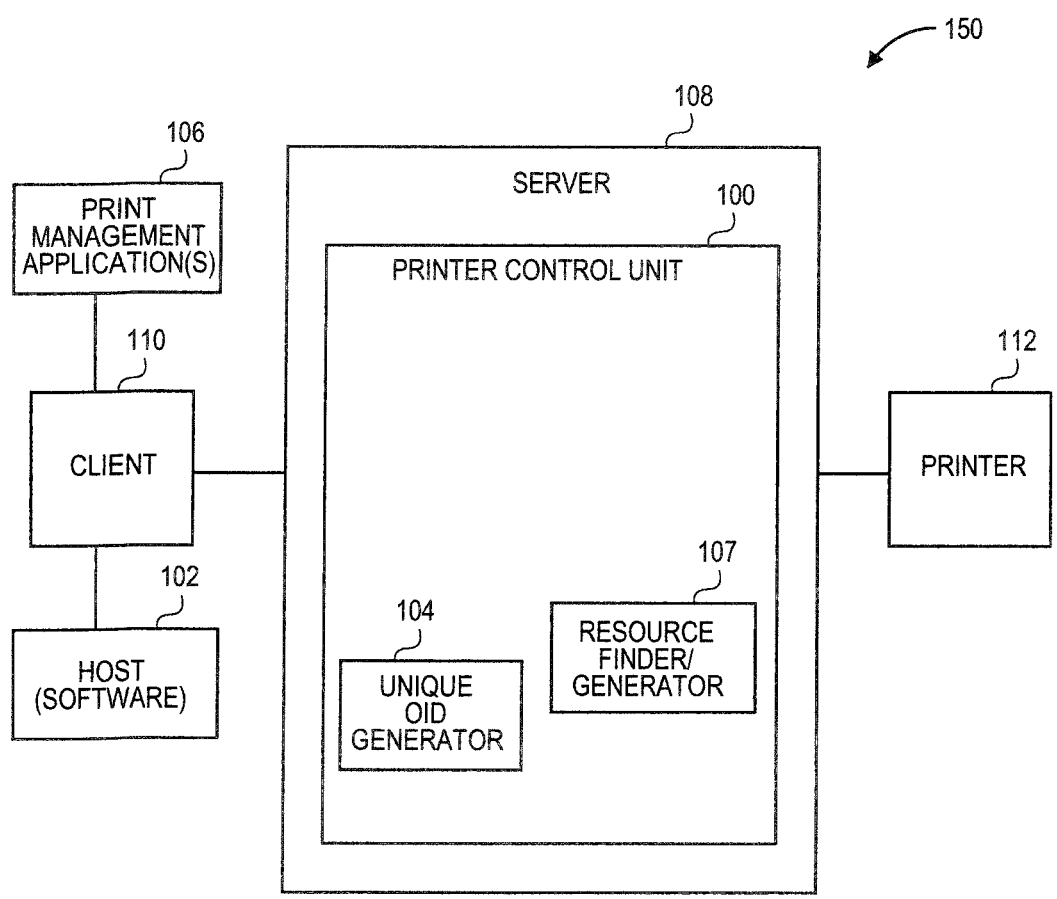
FIGS. 1A and 1B illustrate an embodiment of a unique object identifier generator at a printer control unit of a printing system.

FIG. 1A illustrates an embodiment of a unique object identifier generator 104 at a printer control unit 100 of a printing system 150. In the illustrated embodiment, a computer client system (client) 110 is in communication with a computer server system (server) 108 that is further in communication with a printer 112. Client 110 is further includes or is in communication with host (software) 102 and print management application(s) 106. Server 108 includes a print server having a printer control unit 100. PCU 100 contains unique OID generator 104 and recourse finder/generator 107. Host (software) 102 provides parent resources or resource information (e.g., base resources) to unique OID generator 104. Unique OID generator 104 generates a unique OID for generating a derived resource where the unique OID has the base resources information embedded in it. Printer management application(s) 106 may include one or more applications to help perform various printing- and printing management-related jobs including maintaining relationship between various components and applications of PCU 100. Resource finder/generator 107 is used to find out whether a derived resource exits internally or needs to be generated. Further, resource finder/generator 107 may be used to perform a lookup of the derived resource using a corresponding unique OID previously generated by the unique OID generator 104, eliminating the need for re-generating derived objects.

Host 102 utilizes complex resources having at least one base resource and at least one resource derived from the base resource to promote printing in accordance with the instructions contained in one or more base resources. In certain circumstances, host 102 provides merely base resource(s), requiring PCU 100 to determine whether the derived resource exists internally and, if it doesn't, internally generate a complex resource and, in one embodiment, to complete the complex resource, a unique OID with embedded base resource information is generated for a corresponding derived resource. The unique OID may then be used for internal tracking purpose, eliminating the necessity for regenerating the once-generated derived resource. In one embodiment, unique OID generator 104 generates a unique OID based on the base resource information contained in the base resources to then generate a derived resource. The unique OID generation process for generating the derived resource satisfies future derived resource lookups where merely base resource information is provided, eliminating the need for PCU 100 to repeatedly evaluate whether the derived resource exists internally or repeatedly generate the same derived resource, resulting in saving system resources and enhancing system performance.

For a complex resource, unique OID generation for the derived resource can be a repeatable process wherein all dependent base resources are utilized as input to generate the derived object unique OID. Upon completion of the internal derived resource generation process, the unique OID may be used for internal resource tracking purposes to prevent re-generation of the same derived resource, saving valuable system resources. For example, when host 102 later requests operations involving supplied base resources, PCU 100 uses the unique OID generated by unique OID generator 104 to locate the corresponding derived resource, averting computationally-expensive regeneration of the derived resource. For a non-complex resource, the unique OID generation process consists only of the corresponding derived resource.

In one embodiment, a unique OID includes and encodes the parent resource (e.g., base resource) information for the to-be-generated child resource (e.g., derived resource). The encoding of the base resource information in the unique OID is used to avoid generating duplicates of the corresponding derived resource. The encoding or encrypting may be performed by applying, for example, the Message-Digest algorithm 5 (MD5), Copyright by RSA, to the parent data/instructions of the involved one or more base resources. MD5 is a well-known cryptographic hash function with a 128-bit hash value.

PCU 104 determines when and how to generate a derived resource based upon the information from the host-provided base resource(s). If a derived resource is to be internally generated, a derived resource unique OID may be based on the Abstract Syntax Notation One (ASN.1) format to be compatible with other printer control unit managed resource. ASN.1 refers to a formal language for abstractly describing messages to be exchanged among an extensive range of applications involving the Internet, cellular phones, electronic communications, smart networks, printing, wireless broadband, and other resource-restricted and resource-constrained environments.

The transaction sequences of generating a unique OID may include the following. First, MD5 is applied to all data or information of the involved one or more parent or base resources. Second, the derived resource object size is calculated based on the size of the base resources. For example, the object size and the amount of data for each of the base resources are measured to determine the object size of the derived resource (e.g., the object size of the derived resource is the accumulation of the object size and the amount of data/information of each of the base resources). Third, the registered OID seed corresponding to the derived resource type is selected. For example, a certain set of resource objects are registered according to a governing body and these registered objects or seeds are used to help determine the resource types that are being used.

Fourth, the generated resource unique OID length is calculated. The unique OID length represents the number of bytes it takes to represent the object size, such as the accumulation of the bytes size of the base resources, the seed, etc. Finally, the OID components of the unique OID are encoded in the ASN.1 format to produce the final derived resource unique OID.

In one embodiment, the aforementioned technique embeds the base resource information in the derived resource MD5 unique OID component, and further embeds the object size of the based resources in the derived resource object size unique OID component. These two components exhibit a relationship between the involved base resources and the derived resource, facilitating repeatable regeneration of the unique OID for lookup purposes while satisfying and maintaining the OID uniqueness.

Figure 1B:
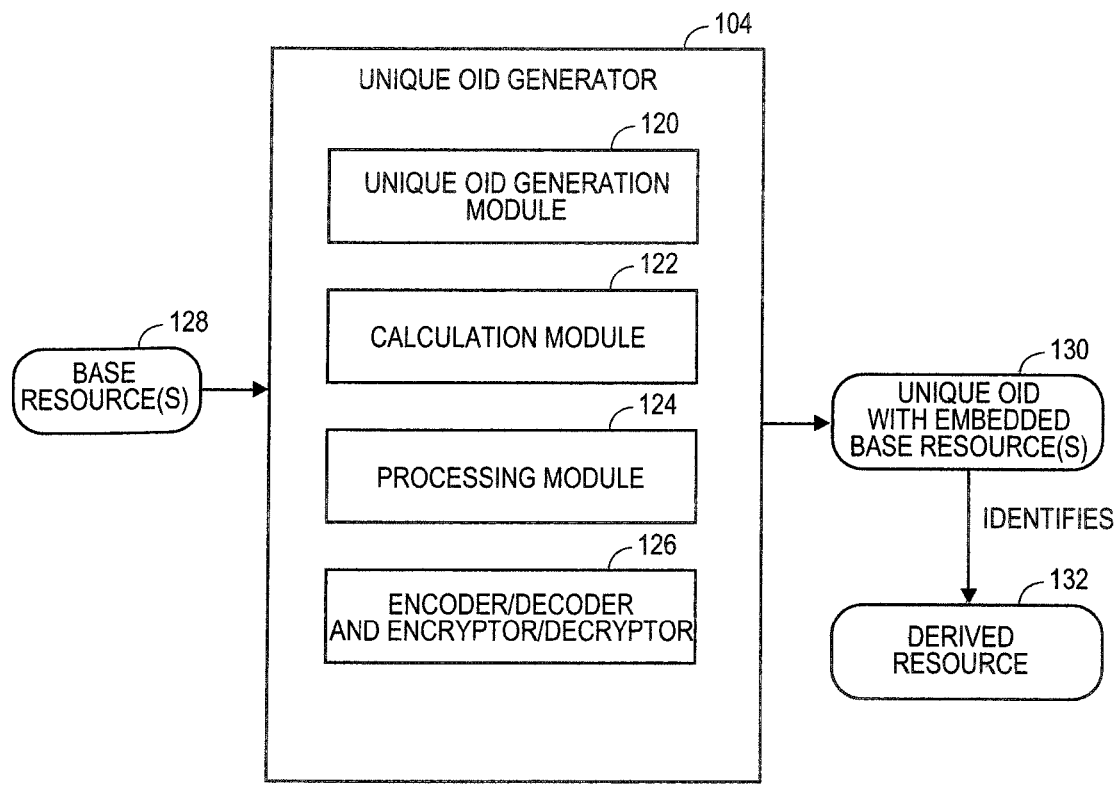

Referring now to FIG. 1B, it illustrates an embodiment of a unique Object Identifier generator 104. In one embodiment, unique OID generator 104 generates a unique OID 130 that includes base information from one or more base resources 128 to a corresponding OID for a derived resource. Unique OID generator 104 may include various components or module to perform the necessary functions, calculations, and/or transaction sequences to generate the unique OID 130. In the illustrated embodiment, unique OID generator 104 includes unique OID generation module 120, calculation module 122, processing module 124, and encoder/decoder-encryptor/decryptor 126.

For example, as illustrated with respect to FIG. 1B, the application of MD5 to the relevant base resource information and the encoding of the OID components in the ASN.1 format are performed by encoder/decoder-encryptor/decryptor 126, while other tasks, such as the recognition of the base resource information, certain formats, seeds, etc., verification or validation of certain data, processing of various steps, selection of an OID seed, providing communication between other components 120, 122, 126, and the like may be performed by processing module 124.

Calculation module 122 is used to perform various calculations, such as calculating the object and information size of base resources, object size of a derived resource, byte size of an OID seed, etc. Finally, unique OID generation module generates a unique OID for a derived resource as described throughout this document, while unique OID with embedded base resources 130 identifies the derived resource 132.

Figure 2:
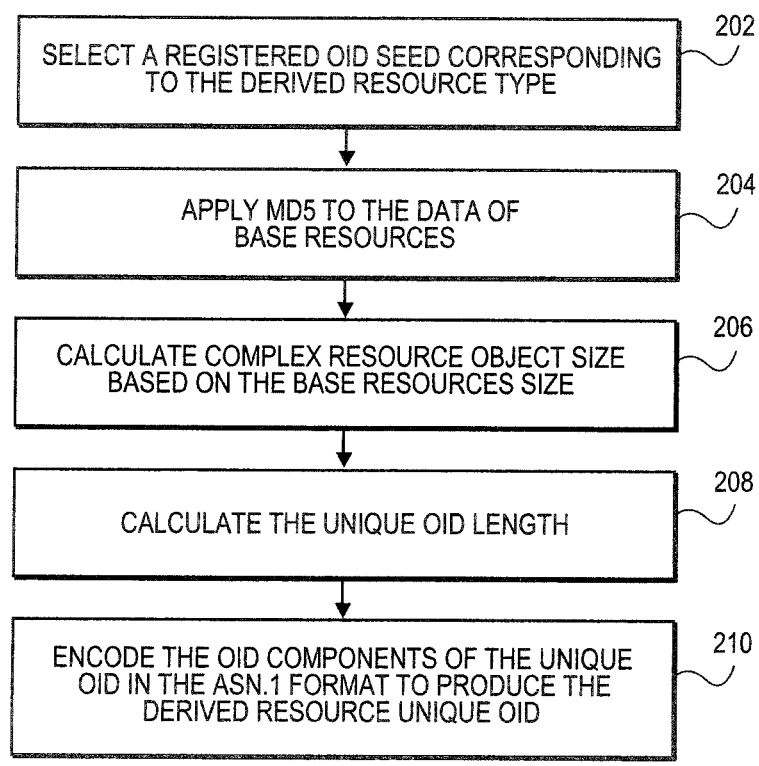
FIG. 2 illustrates an embodiment of a process for generating a unique Object Identifier for a derived resource.

FIG. 2 illustrates an embodiment of a process for generating a unique Object Identifier for a derived resource. In one embodiment, a unique OID is generated to enable a one-time generation of a derived resource and/or subsequent access of the generated derived resource rather than having to regenerate the derived resource each time a process is to be repeated. At processing block 202, a registered OID seed corresponding to a derived resource type is selected. For example, a certain set of resource objects are registered according to a governing body and these registered objects or seeds are used to help determine the type of resources (e.g., base resources) that are being used. At processing block 204, MD5 is applied to all data/information/instructions of the involved one or more parent or base resources. At processing block 206, the complex resource object size is calculated based on the size of the base resources. For example, the object size and the amount of data at each of the base resources are measured to determine the object size of the derived resource (e.g., the object size of the derived resource is the accumulation of the object size and the amount of data of each of the base resources).

At processing block 208, the generated resource unique OID length is calculated. The unique OID length represents the number of bytes it takes to represent the object size, such as the accumulation of the bytes size of the base resources, the seed, etc. At processing block 210, OID components of the unique OID are encoded in the ASN.1 format to produce the final derived resource unique OID.

Figure 3:
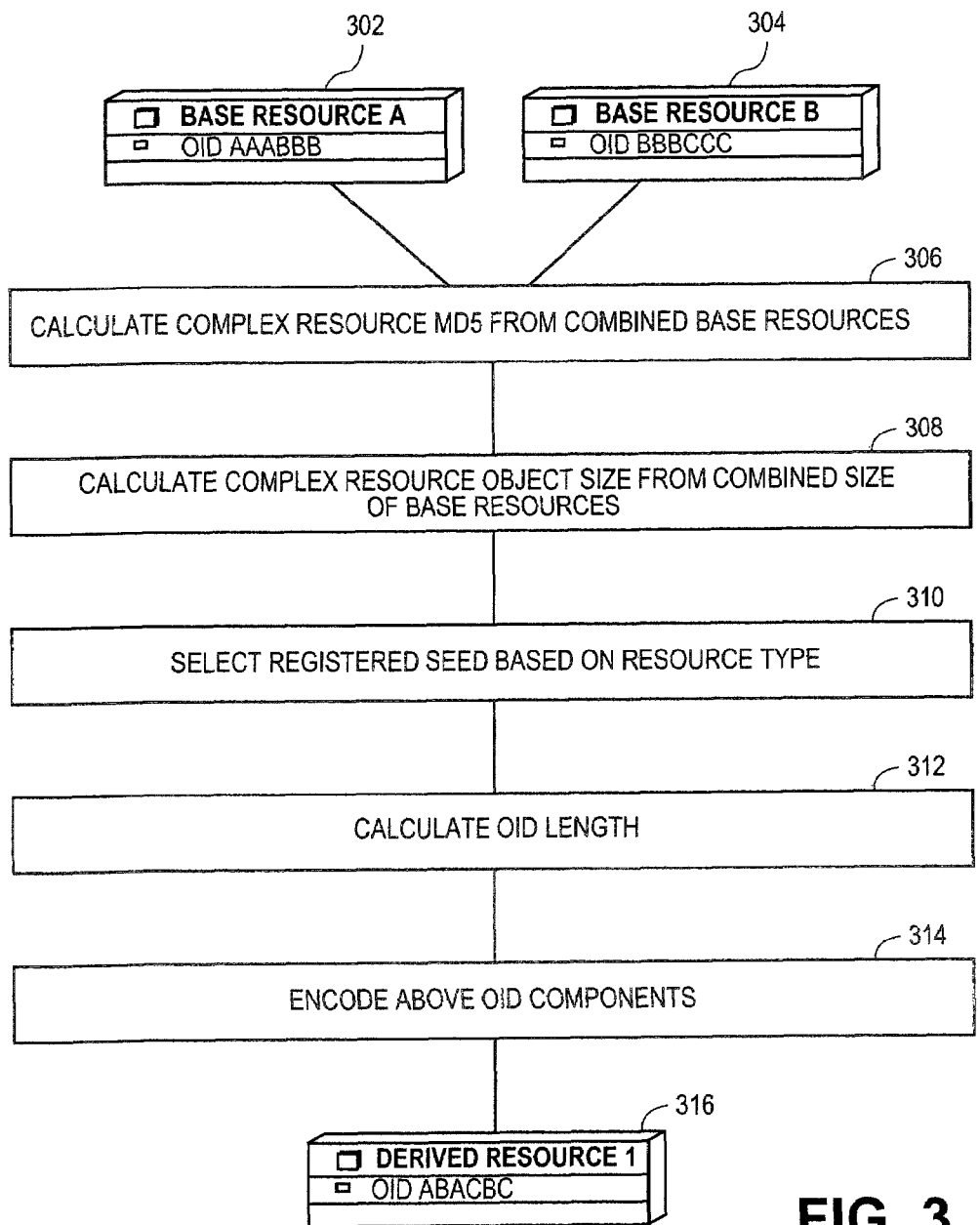
FIG. 3 illustrates an embodiment of a transaction sequence for generating a unique Object Identifier for a derived resource.

FIG. 3 illustrates an embodiment of a transaction sequence for generating a unique Object Identifier for a derived resource. In one embodiment, base resources A 302 (OID AAABBB) and B 304 (OID BBBCCC) are illustrated as they are provided to the unique OID generator by the host at PCU. At processing block 306, a complex resource MD5 is calculated from the combined base resources 302, 304. At processing block 308, the complex resource object size (e.g., Link Color Conversion Object size: X'24F05') is then calculated from the combined size of the two base resources 302, 304.

At processing block 310, a registered seed (e.g., 1.2.208.171.1) is selected based on the resource type (e.g., Link Color Conversion Color Management Resource) of the base resources 302, 304. The OID length of the unique OID is calculated at processing block 312. The OID components are encoded at processing block 314. A derived resource 1 316 is generated using the unique OID (e.g., OID ABACBC).

FIG. 4 illustrates an embodiment of a transaction sequence for calculating various components 416-424 of a unique OID. In the illustrated embodiment, various tables 402-410 are illustrated to show a transaction sequence for calculating various unique OID components 416-424. Each table 402-410 includes two columns: OID column 412 that lists various OID components 416-424 and value column 414 listing values of 426-432 of the corresponding OID components 416-424.

In the illustrated embodiment, X'06' is selected for a final ASN.1 format, shown in table 402 as a value 426 for OID format 416. In other words, the applied OID-encoding results in the X'06' value 426. Then, a CMOCA seed is selected, while the applied OID-encoding results in a value 428 for OID seed 420. Then, OID-encoding the previously-generated MD5 values results in a new value 430 for OID MD5 422. Further, OID-encoding the resource object size (e.g., Link Color Conversion Object size), which includes a sum of the base resources' sizes, results in a value 432 for OID Object Size 424.

The summation of the bytes to represent the sum of the values of OID-encoded format 416, OID-encoded MD5 422, and OID-encoded Object Size 424 provides a value 434 for a final OID length 418. The final encoded OID value 436 represents summation of all values 426-434 of the OID components 416-424.

FIG. 5 illustrates a computer system 500 on which an embodiment of a unique Object Identifier generator 104 may be implemented. Computer system 500 includes a system bus 520 for communicating information, and a processor 510 coupled to bus 520 for processing information. According to one embodiment, processor 510 is implemented using one of the multitudes of microprocessors. Nevertheless one of ordinary skill in the art will appreciate that other processors may be used.

Computer system 500 further comprises a random access memory (RAM) or other dynamic storage device 525 (referred to herein as main memory), coupled to bus 520 for storing information and instructions to be executed by processor 510. Main memory 525 also may be used for storing temporary variables or other intermediate information during execution of instructions by processor 510. Computer system 500 also may include a read only memory (ROM) and or other static storage device 526 coupled to bus 520 for storing static information and instructions used by processor 510.

A data storage device 525 such as a magnetic disk or optical disc and its corresponding drive may also be coupled to computer system 500 for storing information and instructions. Computer system 500 can also be coupled to a second input/output (I/O) bus 550 via an I/O interface 530. A plurality of I/O devices may be coupled to I/O bus 550, including a display device 524, an input device (e.g., an alphanumeric input device 523 and or a cursor control device 522). The communication device 521 is for accessing other computers (servers or clients) via external data network. The communication device 521 may comprise a modem, a network interface card, or other well-known interface device, such as those used for coupling to Ethernet, token ring, or other types of networks.

Embodiments of the invention may include various steps as set forth above. The steps may be embodied in machine-executable instructions. The instructions can be used to cause a general-purpose or special-purpose processor to perform certain steps. Alternatively, these steps may be performed by specific hardware components that contain hardwired logic for performing the steps, or by any combination of programmed computer components and custom hardware components.

Elements of the present invention may also be provided as a machine-readable medium for storing the machine-executable instructions. The machine-readable medium may include, but is not limited to, floppy diskettes, optical disks, compact disk-ROMs (CD-ROMs), and magneto-optical disks, ROMs, RAMs, erasable programming ROMs (EPROMs), electrically erasable programming ROMs (EEPROMs), magnetic or optical cards, propagation media or other type of media/machine-readable medium suitable for storing electronic instructions. For example, the present invention may be downloaded as a computer program which may be transferred from a remote computer (e.g., a server) to a requesting computer (e.g., a client) by way of data signals embodied in a carrier wave or other propagation medium via a communication link (e.g., a modem or network connection).

Throughout the foregoing description, for the purposes of explanation, numerous specific details were set forth in order to provide a thorough understanding of the invention. It will be apparent, however, to one skilled in the art that the invention may be practiced without some of these specific details. Accordingly, the scope and spirit of the invention should be judged in terms of the claims which follow.

What is claimed is:

1. A system comprising:
    a print control unit coupled with a printer, the print control unit connected to a remote host to provide one or more base resources to a unique Object Identifier (OID) generator, the one or more base resources including printing instructions;
    the unique OID generator to generate a unique OID relating to a derived resource to be generated via a unique OID generation module, wherein the unique OID having base resource information embedded in it further includes the printing instructions of the one or more base resources to enable a single generation of a derived resource and one or more subsequent accesses of the generated resource without having to regenerate the derived resource for each of the one or more subsequent accesses, wherein a base resource serves as parent to the derived resource and wherein a derived resource object size associated with the derived resource is calculated based on a base resource object size associated with the base resource; and a resource generator to internally generate the derived resource related to the unique OID, wherein the resource generator is further to determine whether the derived resource exists internally or needs to be generated by performing a lookup of the derived resource using the unique OID and its embedded base resource information to locate the derived resource without having to regenerate once-generated derived resources including the derived resource, wherein the print control unit is further to determine whether the derived resource exists internally or needs to be generated by internally generating a complex resource or performing internal tracking.

2. The system of claim 1, wherein the print control unit further comprises a resource finder to, using the unique OID, subsequently perform internal look-ups of the derived resource as needed, without having to regenerate the derived resource related to the unique OID.

3. The system of claim 1, wherein the printer to print a document according to the derived resource.

4. The system of claim 1, wherein each of the one or more base resources are used to generate a derived resource including a child resource of the one or more base resources, the one or more base resources including one or more parent resources, and wherein the base resource information relates to a base resource serving as a parent resource to the derived resource and wherein the base information is embedded into the unique OID to avoid generating duplicates of the derived resource.

5. The system of claim 1, wherein the unique OID generator further includes a calculation module to calculate the base resource object size and an amount of data associated with the base resource, wherein the derived resource object size is further calculated based on the amount of data associated with the base resource, wherein a registered OID seed is selected to determine a type of the derived resource, and wherein a unique OID length associated with the unique OID is calculated to determine a number of bytes it takes to represent the base resource object size.

6. The system of claim 1, wherein the print control unit further comprises an encryptor to encrypt the printing instructions of the one or more base resources to embed the printing instructions of the one or more base resources in the unique OID to be used for later identification of the derived resource, wherein the print control unit is further to use the unique OID and its embedded base resource information to locate the derived resource while eliminating the need for regeneration of the once-generated derived resources including the derived resource, wherein using the unique OID for locating the derived resource, based on the base resource information, satisfies future derived resource lookups and reduces the use of resources associated with the print control unit.

7. The system of claim 6, wherein the print control unit further comprises an encoder to encode a plurality of OID components of the unique OID corresponding to the derived resource.

8. A method for providing computer services via a computing device, comprising:

providing one or more base resources to a unique Object Identifier (OID) generator at the computing device, the one or more base resources including printing instructions;

generating a unique OID relating to a derived resource to be generated via a unique OID generation module, wherein the unique OID having base resource information embedded in it further includes the printing instructions of the one or more base resources, wherein a base resource serves as parent to the derived resource and wherein a derived resource object size associated with the derived resource is calculated based on a base resource object size associated with the base resource; and internally generating the derived resource from the one or more base resources to enable a single generation of a derived resource and one or more subsequent accesses of the generated resource without having to regenerate the derived resource for each of the one or more subsequent accesses, wherein the resource generator is further to determine whether the derived resource exists internally or needs to be generated by performing a lookup of the derived resource using the unique OID and its embedded base resource information to locate the derived resource without having to regenerate once-generated derived resources including the derived resource, wherein the print control unit is further to determine whether the derived resource exists internally or needs to be generated by internally generating a complex resource or performing internal tracking.

9. The method of claim 8, further comprising, using the unique OID, subsequently performing internal look-ups of the derived resource as needed, without having to regenerate the derived resource related to the unique OID.

10. The method of claim 8, further comprising printing a document according to the derived resource.

11. The method of claim 8, wherein each of the one or more base resources are one or more parent resources, and the derived resource including a child resource of the one or more base resources, the one or more base resources including one or more parent resources, and wherein the base resource information relates to a base resource serving as a parent resource to the derived resource and wherein the base information is embedded into the unique OID to avoid generating duplicates of the derived resource.

12. The method of claim 8, further comprising calculating the base resource object size and an amount of data associated with the base resource, wherein the derived resource object size further calculated based on the amount of data associated with the base resource, wherein a registered OID seed is selected to determine a type of the derived resource, and wherein a unique OID length associated with the unique OID is calculated to determine a number of bytes it takes to represent the base resource object size.

13. The method of claim 8, further comprising encrypting the printing instructions of the one or more base resources in the unique OID to be used to identify the derived resource, wherein the print control unit is further to use the unique OID and its embedded base resource information to locate the derived resource while eliminating the need for regeneration of the once-generated derived resources including the derived resource, wherein using the unique OID for locating the derived resource, based on the base resource information, satisfies future derived resource lookups and reduces the use of resources associated with the print control unit.

14. The method of claim 13, further comprising encoding a plurality of OID components of the unique OID corresponding to the derived resource.

15. A non-transitory computer program product of a computer readable medium usable with a programmable computer, the computer program product having computer-readable code embodied therein for providing computer services, the computer-readable code comprising instructions for:
provide one or more base resources to a unique Object Identifier (OID) generator, the one or more base resources including printing instructions;
generate a unique OID relating to a derived resource to be generated via a unique OID generation module, wherein the unique OID having base resource information embedded in it further includes the printing instructions of the one or more base resources to enable a single generation of a derived resource and one or more subsequent accesses of the generated resource without having to regenerate the derived resource for each of the one or more subsequent accesses, wherein a base resource serves as parent to the derived resource and wherein a derived resource object size associated with the derived resource is calculated based on a base resource object size associated with the base resource, wherein the resource generator is further to determine whether the derived resource exists internally or needs to be generated by performing a lookup of the derived resource using the unique OID and its embedded base resource information to locate the derived resource without having to regenerate once-generated derived resources including the derived resource, wherein the print control unit is further to determine whether the derived resource exists internally or needs to be generated by internally generating a complex resource or performing internal tracking.

16. The non-transitory computer program product of claim 15, the computer-readable code further comprising instructions for using the unique OID, subsequently performing internal look-ups of the derived resource as needed, without having to regenerate the derived resource already generated using the unique OID.

17. The non-transitory computer program product of claim 15, wherein each of the one or more base resources includes a parent resource, and the derived resource includes a child resource of the one or more base resources, the one or more base resources including one or more parent resources, and wherein the base resource information relates to a base resource serving as a parent resource to the derived resource and wherein the base information is embedded into the unique OID to avoid generating duplicates of the derived resource.

18. The non-transitory computer program product of claim 15, the computer-readable code further comprising instructions for calculating the base resource object size and an amount of data associated with the base resource, wherein the derived resource object size further calculated based on the amount of data associated with the base resource,
wherein a registered OID seed is selected to determine a type of the derived resource, and
wherein a unique OID length associated with the unique OID is calculated to determine a number of bytes it takes to represent the base resource object size.

19. The non-transitory computer program product of claim 15, the computer-readable code further comprising instructions for encrypting the printing instructions of the one or more base resources to embed the printing instructions of the one or more base resources in the unique OID to be used when generating the derived resource, wherein the print control unit is further to use the unique OID and its embedded base resource information to locate the derived resource while eliminating the need for regeneration of the once-generated derived resources including the derived resource, wherein using the unique OID for locating the derived resource, based on the base resource information, satisfies future derived resource lookups and reduces the use of resources associated with the print control unit.

20. The non-transitory computer program product of claim 19, the computer-readable code further comprising instructions for encoding a plurality of OID components of the unique OID corresponding to the derived resource.

* * * * *